(12) United States Patent
Veluppillai

(10) Patent No.: US 11,554,669 B2
(45) Date of Patent: Jan. 17, 2023

(54) DEDICATED DIGITAL EXPERIENCE COMMUNICATION BUS

(71) Applicant: Ford Global Technologies, LLC, Dearborn, MI (US)

(72) Inventor: Mahinthan Veluppillai, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 296 days.

(21) Appl. No.: 17/009,139

(22) Filed: Sep. 1, 2020

(65) Prior Publication Data

US 2022/0063402 A1    Mar. 3, 2022

(51) Int. Cl.
| | |
|---|---|
| *B60K 35/00* | (2006.01) |
| *G06F 13/36* | (2006.01) |
| *G06F 16/23* | (2019.01) |
| *G07C 5/02* | (2006.01) |
| *B60R 16/023* | (2006.01) |

(Continued)

(52) U.S. Cl.
CPC ............ *B60K 35/00* (2013.01); *B60R 16/023* (2013.01); *G06F 13/36* (2013.01); *G06F 16/2379* (2019.01); *G06F 21/31* (2013.01); *G07C 5/02* (2013.01); *B60K 2370/152* (2019.05); *B60K 2370/157* (2019.05); *B60K 2370/16* (2019.05); *G06Q 50/30* (2013.01)

(58) Field of Classification Search
CPC .............. B60K 35/00; B60K 2370/152; B60K 2370/157; B60K 2370/16; B60K 2370/164; B60K 2370/583; B60K 2370/586; B60K 2370/77; B60R 16/023; G06F 13/36; G06F 16/2379; G06F 21/31; G07C 5/02; G06Q 50/30; H04L 12/40006; H04L 2012/40215; H04L 2012/40273
See application file for complete search history.

(56) References Cited

U.S. PATENT DOCUMENTS

| | | | |
|---|---|---|---|
| 7,275,027 B2 | 9/2007 | Sproule et al. | |
| 7,502,353 B2 * | 3/2009 | Bolz ...................... | G07C 5/008 |
| | | | 370/338 |

(Continued)

FOREIGN PATENT DOCUMENTS

WO     2015-103159 A1     7/2015

OTHER PUBLICATIONS

Murphy, J., et al., "Magic Quadrant for Digital Experience", Gartner, Jan. 17, 2018, ID:G00318713, 39 pages.

(Continued)

*Primary Examiner* — Richard M Camby
(74) *Attorney, Agent, or Firm* — Brandon Hicks; Kilpatrick Townsend & Stockton LLP

(57) ABSTRACT

Techniques for communication between modules of a digital experience platform of a vehicle system are described. The vehicle system may be a ridesharing vehicle with a seat display module at each seat and an auxiliary display module that operates at a vehicle level. The seat display modules and the auxiliary display module communicate across a digital experience communication bus of the vehicle system. The seat display modules and the auxiliary display module change states based on conditions within the vehicle and convey system state updates across the communication bus to update a stored state of each display module vehicle-wide.

20 Claims, 9 Drawing Sheets

(51) Int. Cl.
*G06F 21/31* (2013.01)
*G06Q 50/30* (2012.01)

(56) References Cited

U.S. PATENT DOCUMENTS

| | | | |
|---|---|---|---|
| 8,417,860 B2* | 4/2013 | Choi | H04L 67/12 |
| | | | 710/100 |
| 9,619,114 B2* | 4/2017 | Rutledge | B60W 50/085 |
| 9,780,967 B2* | 10/2017 | Sargent | G07C 5/0825 |
| 2004/0176935 A1* | 9/2004 | Sproule | G07C 5/008 |
| | | | 703/8 |
| 2013/0338919 A1 | 12/2013 | Basir | |

OTHER PUBLICATIONS

"Digital Experience Platforms—An Overview" (n.d.), Infosys, Navigate your next, 12 pages.

\* cited by examiner

DEDICATED DIGITAL EXPERIENCE COMMUNICATION BUS

BACKGROUND

Ride sharing and carpooling are becoming more popular as technology enables operators and riders to more easily communicate availability and pricing for transportation. For example, riders may use a ride-sharing service having an associated software application (e.g. an app) to schedule and pay for a ride such as those provided by various ridesharing services, or may use a more informal carpooling arrangement facilitated by a ride-sharing app that allows drivers and passengers to share vehicle and travel costs. In the foreseeable future, people will be able to schedule an autonomous vehicle pick-up and drop-off using a personal mobile device (smartphone, tablet, computer, wearable, etc.).

SUMMARY

Various embodiments provide a vehicle system including: an auxiliary display module including a processor and a storage, connected to one or more seat display modules via a vehicle communication bus, the auxiliary display module programmed to perform various operations with respect to a digital experience platform of the vehicle system. The operations may include changing a system state of the auxiliary display module from a system not ready (SNR) to a system ready (SR) state in response to receiving an activation signal. The operations also include generating a mission packet in response to changing to the SR state, the mission packet including contents for display at the one or more seat display modules. The operations further include generating ride profile data associated with user experiences and content delivery to the one or more seat display modules, and changing a system state of the auxiliary display module to a ride active (RA) state in response to generating the ride profile data. The operations also include conveying, in response to changing the system state of the auxiliary display module, a status update across the vehicle communication bus, the status update indicating the auxiliary display module has entered a different system state and instructing a change in a system state of the one or more seat display modules based on the system state of the auxiliary display module.

Another general aspect includes a vehicle system, including one or more seat display modules each including a processor and a storage, connected to an auxiliary display module via a vehicle communication bus, the one or more seat display modules programmed to perform various operations with respect to a digital experience platform of the vehicle system. The operations may include changing a system state of the one or more seat display modules from a system not ready (SNR) to a mission ready (MR) state in response to receiving an activation signal. The operations may also include receiving a mission packet from the auxiliary display module in response to receiving a power-on signal, the mission packet including contents for display by the one or more seat display modules and accessing user profile data associated with a particular user of each of the one or more seat display modules. The operations may also include changing the system state of the one or more seat display modules to ride active (RA) state in response to accessing the user profile data. The operations may also include conveying, in response to changing the system state of the one or more seat display modules, a status update across the vehicle communication bus, the status update indicating the one or more seat display modules have changed the system state and instructing a change in a system state of another of the one or more seat display modules based on the system state of the one or more seat display modules.

Another general aspect includes a vehicle system, including one or more seat display modules communicatively coupled to an auxiliary display module via a vehicle communication bus, the one or more seat display modules including a user interface, a processor, and a memory having instructions stored thereon that, when executed by the processor, cause the processor to perform various operations with respect to a digital experience platform of the vehicle system. The operations may include changing a system state of the seat display module based on an activation signal and accessing user data associated with a user of the one or more seat display modules. The operations may also include conveying system state update information via the vehicle communication bus. The operations may also include receiving system state information of the auxiliary display modules via the vehicle communication bus and changing a system state of the seat display module based on the system state information of the auxiliary display module.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
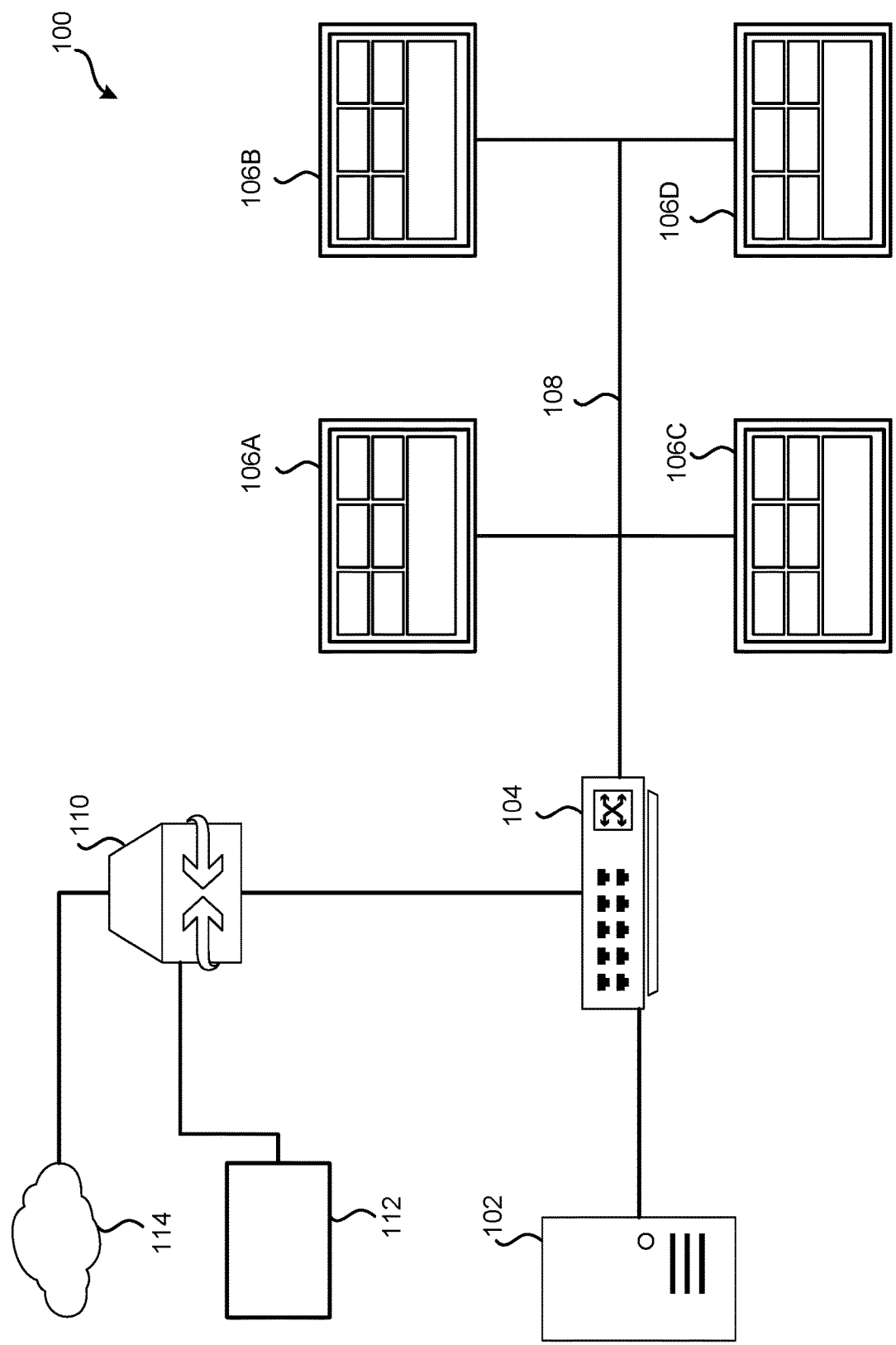
FIG. 1 illustrates a simplified diagram showing interactions between display modules of a vehicle system, according to some embodiments.

Vehicles may be shared among multiple passengers, particularly along well-traveled routes. Current ride-sharing strategies generally do not recognize various issues related to sharing a vehicle with multiple passengers that may be traveling to different destinations having at least a portion of a route in common. For example, available ride-sharing strategies do not notify, in real-time, potential passengers when a passenger is boarding the vehicle, or that a previously available seating area or pod has been occupied. For example, a ride-sharing vehicle may not inform a potential passenger, while they are considering booking the ride, updates with respect to vehicle occupancy and destinations already planned for the current passengers. Similarly, current strategies do not facilitate providing personalized media and content to different passengers traveling together to various destinations.

For vehicles equipped with individual displays associated with particular seating locations, the display at the seating area may display the passenger identifier (e.g. a nickname, an assigned number, or passenger's name) and route/destination. In some examples, the individual displays may provide individual content and media to each individual passenger. In at least one embodiment, display at the seating area may provide an interface for a passenger to verify their identity, select or alter a route, update personal preferences, consume media, or otherwise interact with the seat display module.

In some vehicles, including autonomous vehicles, that may be used for vehicle sharing, the vehicle may include as many seat display modules as the maximum number of passengers allowed in the vehicle (e.g. four seat display modules) and one auxiliary display module. In some examples, the auxiliary display module is on-board the vehicle, though in some examples, the auxiliary display module may be located remotely. The auxiliary display module may, for example be a single module that controls multiple vehicle systems remotely. Each module is an independent device that is configured to start up individually and provide personalized experience to the passenger at the respective seat within the vehicles. The various modules are connected together on a vehicle-wide network such that the auxiliary display module can provide and control particular user experiences and delivery of content to each of the seat display modules.

In order to provide better inter-module communication and interactions, system states and sub-system states of the different modules are established and triggers for state transition messages among states are defined herein. System states indicate the health and status of each module and are broadcast across the bus. The auxiliary display module and seat display modules each make decision to provide personalized service based on sub-system states and other modules' sub-system states. A digital experience platform communication bus is introduced for inter-module communication.

The systems and methods described herein provide a digital experience communication bus for vehicles that may be implemented as fleet vehicles and/or as ridesharing vehicles. In some embodiments, the vehicle may not be owned by any of the passengers within the vehicle, particularly in an instance of a ridesharing autonomous vehicle. At different locations, particularly at each seat of the vehicle, a seat display should be in communication with the auxiliary display module, which controls the entire vehicle system and provides content to each seat display module. Each seat display module may, for example, be used to authenticate an identity of a passenger and a passenger destination prior to departure of the vehicle after picking up an additional passenger. In some examples, each seat display module may provide an authentication portal, a media display, a game interface, and other interfaces for each passenger. Embodiments may allow for deactivation of one or more of the interfaces or the content based on passenger preference (e.g. child control). The auxiliary display module may control outward-facing advertisements on the exterior of the vehicle as well as delivery of content and information to each of the seat display modules.

In particular, the techniques and systems described herein provide several advantages over conventional techniques and systems. For example, the digital experience communication bus provides information between an auxiliary display module and individual seat display modules to provide personalized interfaces and authentication portals for each passenger in the vehicle. Typical systems are not equipped to provide different displays, authentication, and different information to each display of a vehicle system based on individual identities of passengers within the vehicle, especially passengers with different destinations, such as in a ride sharing vehicle.

As required, detailed embodiments are disclosed herein; however, it is to be understood that the disclosed embodiments are merely representative and the claimed subject matter may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Turning now to FIG. 1, a simplified diagram showing interactions between display modules of a vehicle system 100 is illustrated, according to some embodiments. The vehicle system 100 includes an auxiliary display module 102, an ethernet switch 104, seat display modules 106A-D, digital experience platform communication bus 108, gateway 110, autonomous vehicle pilot information manager 112, and cloud network 114. The vehicle system 100 enables communication between the auxiliary display module 102 and the seat display modules 106A-D over the digital experience platform communication bus 108. Communications to other components of the vehicle system 100 are provided through the gateway 110. The vehicle system 100 may be an autonomous car. The vehicle system 100 may be an autonomous car that is included in a fleet of autonomous cars for providing ride sharing service in a service area.

The autonomous vehicle pilot information manager (AVPIM) 112 is a computer. The AVPIM 112 can be programmed to perform one or more functions typical of the autonomous vehicle, such as state management of the autonomous vehicle, trip management, passenger interaction and management of the autonomous vehicle's risk-minimized maneuver. In addition, the AVPIM 112 be programmed to send and receive information across the digital experience platform communication bus 108, such as authentication information, confirmation of identity authentication of a passenger, destination information, route information, and the like.

The cloud network 114 may provide cloud computing resources and a cloud network to the vehicle system 100. The cloud network 114 may include the cloud computing system 900 of FIG. 9. The cloud network 114 may include databases or access to databases including passenger information, route information, destination information, content, access to other vehicle systems, and the like.

The gateway 110 connects the digital experience platform communication bus 108 and the ethernet switch 104 to other elements of the vehicle system 100 including the AVPIM 112, cloud network 114, and various electronic control units (ECUs) of the vehicle system 100 that control certain operations of the vehicle system 100. The gateway 110 may be an enhanced central gateway that provides for switching, sharing, and transmission/receiving of different forms and types of data at the vehicle system 100. The gateway 110 may be configured to support existing functionality, support higher-speed in-vehicle networks, provide for enhanced connectivity and enterprise functions, address cyber security, provide for ad-hoc general purpose computing within the vehicle, support an information architecture instead of a data architecture, and provide services in support of a dynamic human-machine interface (HMI).

The gateway 110 may be configured to provide an electrical interface between the vehicle communication buses, including the digital experience platform communication bus 108 used to communicate within the vehicle system 100. In an example, the gateway 110 may be configured to translate signals and commands between CAN and/or in-vehicle ethernet vehicle buses, such as ethernet switch 104, connected to the gateway 110. For instance, the gateway 110 may support connection to up to ten CAN vehicle buses and up to seven ethernet switches 104. By supporting ethernet in addition to CAN, the gateway 110 may be able to provide support for higher-speed in-vehicle network communication, while still performing existing or legacy gateway functions within the vehicle system 100.

The auxiliary display module 102 serves content and information to the seat display modules 106A-D and may also provide information to an additional display, such as an advertising display on the exterior of the vehicle system 100. In some examples, the auxiliary display module 102 and the AVPIM 112 may each be embodied in the computing system of the vehicle system 100. For example, the auxiliary display module 102 and the AVPIM 112 may each be included in the computing system 702 of vehicle system 700 shown in FIG. 7. The auxiliary display module 102 delivers sponsored content to seat display modules 106A-D when the seat display modules 106A-D are in a mode for active operation of the vehicle system 100. The auxiliary display module 102 delivers content to each of the seat display modules based on a login status at each of the seat display modules, based on user preferences of a user logged in to each of the seat display modules, and provides ride information displaying information related to one or more current trips the vehicle system 100 is undertaking. The auxiliary display module 102 includes different system states, as described below with respect to FIG. 4. The different system states are based on the status of the vehicle system 100 and determine the interactions between the auxiliary display module 102 and the seat display modules 106A-D. The auxiliary display module 102 may include a processor and memory to carry out operations as instructed by instructions stored on the memory. The auxiliary display module 102 may include a computing system such as the computing device 800 of FIG. 8. The auxiliary display module 102 functions as a primary computing device or controlling computing device for digital experiences and user experiences. The auxiliary display module 102 receives information from modules connected within the vehicle system 100 including the AVPIM 112. The AVPIM 112 controls vehicle driving and control. The auxiliary display module 102 also receives information, commands, controls, and digital contents from cloud network 114.

The auxiliary display module 102 may configure interactions among the seat display modules 106A-D, for example to coordinate a gaming or pool mode where the different seat display modules 106A-D are displaying related, similar, or identical information to different users. For example, in a gaming mode the auxiliary display module 102 may coordinate each of the seat display modules 106A-D to participate in a game shared between each of the seat display modules 106A-D and associated users. The auxiliary display module 102 may also be capable of designating a primary seat display module for the vehicle. The primary seat display module may be capable of controlling vehicle-wide settings such as overall climate settings such as an environmental conditioning system, overall sound settings such as a vehicle wide audio system, and the like.

In some examples, the seat display module 106A-D may be capable of activating one or more operations of the vehicle system 100. In addition to the environmental conditioning systems and audio systems described above, the seat display module 106A-D may convey a signal to activate other operations of systems or subsystems of the vehicle system 100. For instance, the seat display module 106A-D may convey a signal to activate operation of a propulsion system of the vehicle system after user identities are authenticated for one or more passengers within the vehicle system 100. Additional subsystems including infotainment, control, lights, and other such systems may also be activated by the seat display module 106A-D in response to signals conveyed from the seat display module 106A-D. The seat display module 106A-D may also access user data such as user preferences from a remote database. The user data may describe preferences for a user with respect to cabin temperature, media content to consume, volume, and other such configurable settings of the vehicle system 100. The user data, which may be included as a user profile and/or as user profile data may be used to customize the experience with in the vehicle system 100 to the preferences of the users logged in through the seat display modules 106A-D.

In some examples, the auxiliary display module 102 may be located on-board the vehicle system 100, for example as part of a computing device of the vehicle system 100. In some examples, the auxiliary display module 102 may be located remote to the vehicle system 100 and in communication over a network or wireless communication means with the vehicle system 100. For example, a single auxiliary display module 120 may control a single vehicle system 100, such as an autonomous car. In another example, a single auxiliary display module 102 may control operations of a fleet of autonomous vehicles in a service area. For example, the auxiliary display module 102 may initiate communications between the vehicle system 100 and additional vehicle systems located within a particular geographic area, or connected over a network such as the internet and located remotely.

The system states of the auxiliary display module 102 include System Not Ready (SNR), System Ready (SR), Mission Active (MA), and Ride Active (RA). In some examples, the system states may also include sub-states. For example, the SR state may include sub-states for an advertisement mode and a mission ready mode. The advertisement mode may be provided such that the auxiliary display module 102 provides advertisements to an exterior of the vehicle system 100 or to one or more of the seat display modules 106A-D. The mission ready mode may include when the vehicle system 100 is prepared to receive mission information for new passengers and embark on new trips. The RA state may include sub-states for a pool mode, an advertisement mode, a normal mode, and a gaming mode. In the pool mode, the auxiliary display module 102 may cause the seat display modules 106A-D to share information or display similar information on the different seat display modules 106A-D. In the advertisement mode, the auxiliary display module 102 may send advertising information to the one or more seat display modules 106A-D during operation of the vehicle system 100. In the normal mode, the auxiliary display module 102 may host information to each of the seat display modules 106A-D as requested by a passenger associated with each of the seat display modules 106A-D. In the gaming mode, the auxiliary display module 102 may provide a shared gaming environment to one or more seat display modules 106A-D, for example to facilitate a game played amongst passengers of the vehicle. In some examples, the gaming mode may also enable passengers to interact with passengers of the vehicle system 100 or other vehicle systems, for example through a connection of the auxiliary display module 102 of the vehicle system 100 with an auxiliary display module of another vehicle system over the cloud network 114.

Figure 8:
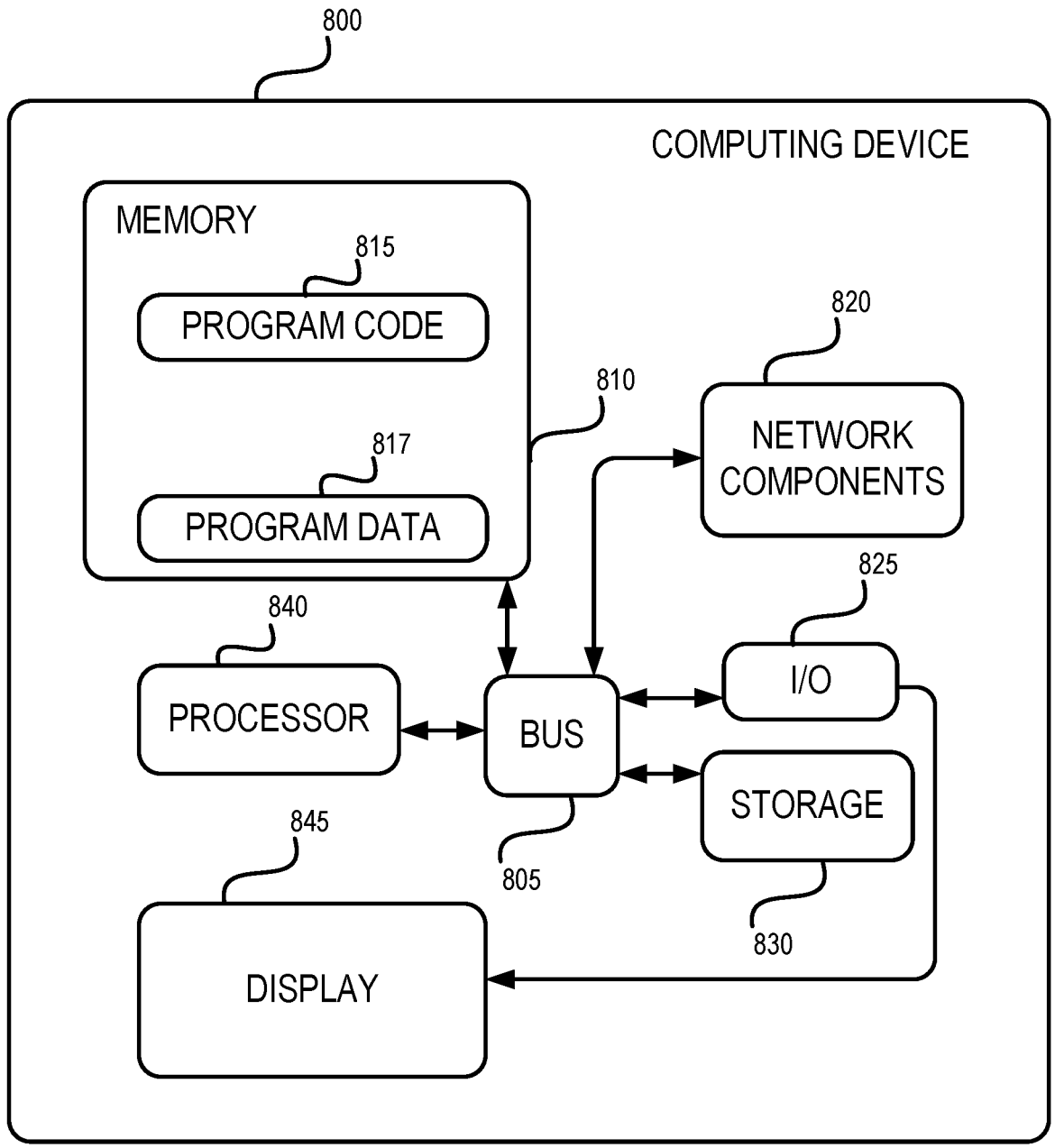
FIG. 8 illustrates a block diagram of a computing system, according to some embodiments.

The seat display modules 106A-D each include a display, processor, and memory, for example as described with respect to computing device 800 of FIG. 8. The seat display modules 106A-D also include input and output devices for passengers to interact with the seat display modules 106A-D. The seat display modules 106A-D include different system states for different operations of the seat display modules 106A-D, for example when activated by a passenger taking a ride in the vehicle system 100. The system states may include a SNR state, a mission ready (MR) state, a login ready (LR) state, and a RA state. The mission ready state may indicate that the seat display module 106A-D is ready to receive mission information, mission information including destinations of one or more passengers within the vehicle system 100. The login ready state may be ready for login and authentication of a passenger identity at each of the seat display modules 106A-D. The passenger identity may be authenticated when a passenger signs into the seat display module 106A-D. The seat display module 106A-D may authenticate the user identity based on user credentials, such as a password and login ID, or may authenticate based on other information, such as identifying a mobile device associated with a user identity in the possession or proximity of the user. Additional authentication forms such as RFID tags and other known identity verification methods may also be implemented. The seat display modules 106A-D may also include sub-states for systems such as a pool mode, advertisement mode, normal mode, gaming mode, and fullscreen mode. In some embodiments, the seat display modules 106A-D may be provided with privacy screens such that only the passenger seated in front of the seat display module 106A-D may see the content displayed on the seat display module 106A-D. The seat display modules 106A-D may include wireless connectivity for connecting to user devices, such as mobile phones, tablets, personal computer, and the like. The seat display modules 106A-D may also include wired and/or wireless communication for audio devices.

In operation, the auxiliary display module 102 and the seat display modules 106A-D communicate system changes and updates across the digital experience platform communication bus 108. For instance, when the auxiliary display module 102 changes from an SNR state to a SR state, an update may be communicated across the digital experience platform communication bus 108 to ensure proper operation, health, and delivery of appropriate content to each of the seat display modules 106A-D.

Figure 2:
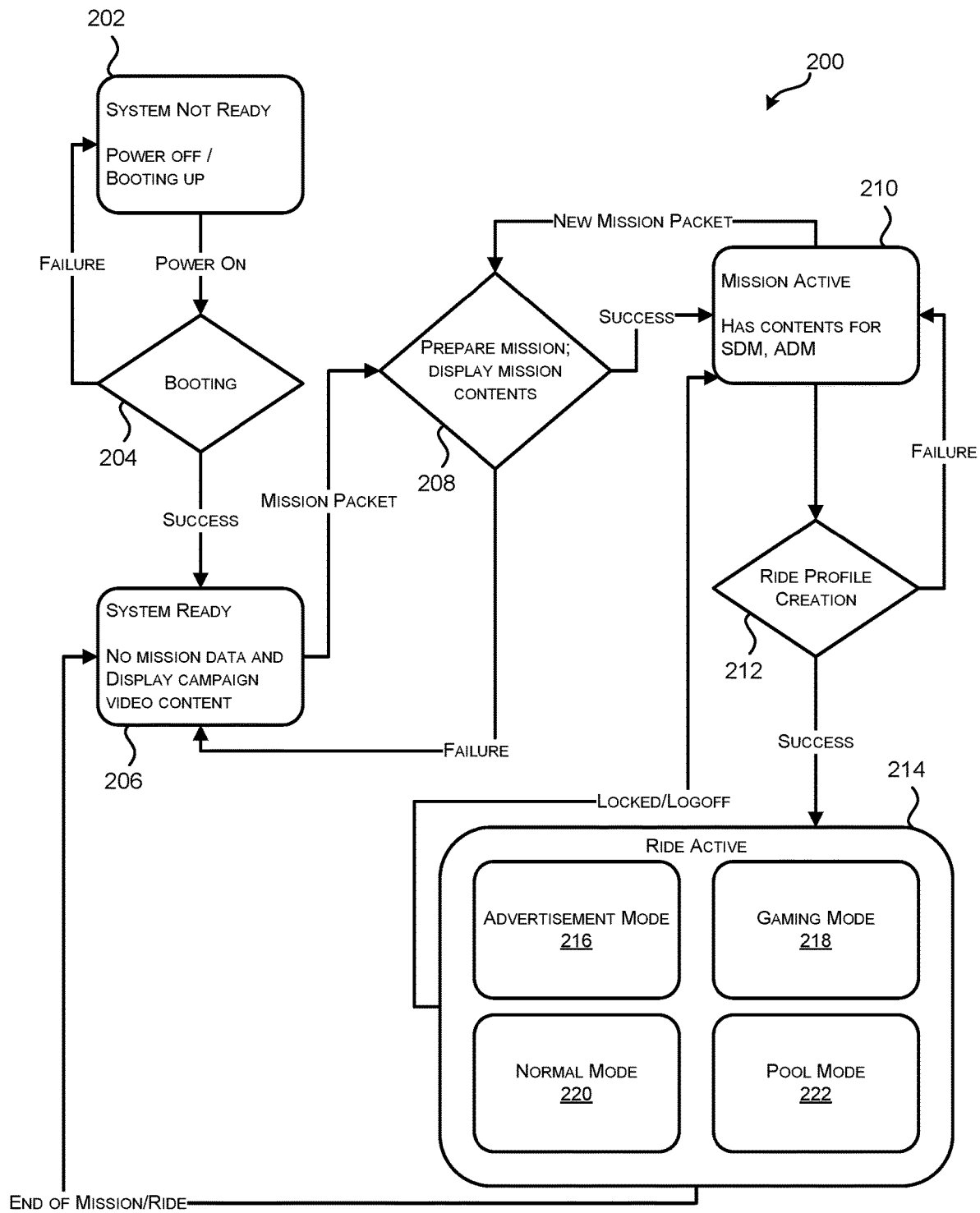
FIG. 2 illustrates a block diagram displaying states and sub-states of an auxiliary display module, according to some embodiments.

FIG. 2 illustrates a block diagram 200 displaying states and sub-states of an auxiliary display module 102, according to some embodiments. The block diagram 200 illustrates a flow of changes to system states of the auxiliary display module 102 during operation of the vehicle system 100.

The block diagram 200 begins at block 202 where the auxiliary display module 102 is in a system not ready state, for example while the vehicle system 100 is not started or initialized for operation. The vehicle system 100 is subsequently powered on at block 204 where the auxiliary display module 102 boots up.

Upon successful startup of the auxiliary display module 102, the auxiliary display module 102 is changed from the SNR state to the SR state at block 206. The SR state may include the auxiliary display module 102 prepared to receive mission data. While in the SR state, the auxiliary display module 102 displays content such as video and advertisement content to the seat display modules 106A-D.

A mission packet may be received at the auxiliary display module 102 at block 208, for example from the cloud network 114, AVPIM 112, or one of the seat display modules 106A-D. The mission packet includes mission information such as a destination, route, pickup time, dropoff time, and other such information related to the trip requested by the passenger. The auxiliary display module 102 may convey display information to the seat display modules 106A-D and one or more additional displays. The information may include the route information and a present location of the vehicle.

The vehicle system 100 may subsequently transition into a mission active state at block 210, when the mission is begun, for example after authenticating user information. The mission active state may cause the auxiliary display module 102 to convey information to one or more of the seat display modules 106A-D related to the mission data.

At block 212, the auxiliary display module 102 generates a ride profile, for the ride requested by the passenger. The ride profile including the mission information, the content provided to the seat display modules 106A-D, and created in response to authenticating the identity of the passenger once they enter the vehicle system 100.

Once the ride begins, or following authentication of the passenger, the auxiliary display module 102 transitions to the ride active state at block 214. The ride active state persists at the auxiliary display module 102 until the destination is reached by the vehicle system 100. In the ride active state, the auxiliary display module 102 may be in the advertisement mode 216, gaming mode 218, normal mode 220, pool mode 222, or any other suitable mode of the auxiliary display module 102 based on the function of the vehicle system and the elements of the modules. Upon completion of the ride/mission, the auxiliary display module 102 returns to block 206 where the vehicle system 100 is prepared for an additional ride or mission from a new passenger of the vehicle system 100.

The digital experience platform communication bus 108 connects the auxiliary display module 102 and the seat display modules 106A-D. As the auxiliary display module 102 changes system states, as described with respect to FIG. 2, a message is broadcast across the digital experience platform communication bus 108. In response, all modules connected to the digital experience platform communication bus 108 update the system status of other modules. The update, which may be conveyed from the auxiliary display module 102 or the seat display module 106A-D, depending on which module changed status, may cause one or more other actions to occur. For example, the status update may cause the seat display module 106A-D to switch from an inactive or advertising mode to an active mode, ready for interaction with one or more associated users. The status update may cause the seat display module 106A-D to transition from being inactive devices to active devices displaying information or receiving information from the user or another device or module. This update enables interaction with other modules and enables the auxiliary display module 102 to make proper decisions with respect to content delivered to each of the other modules. For example, the seat display modules 106A-D may be in different system states such that one receives advertisements while another is in a gaming mode. The updates ensure that the auxiliary display module 102 conveys the correct information to each module.

Figure 3:
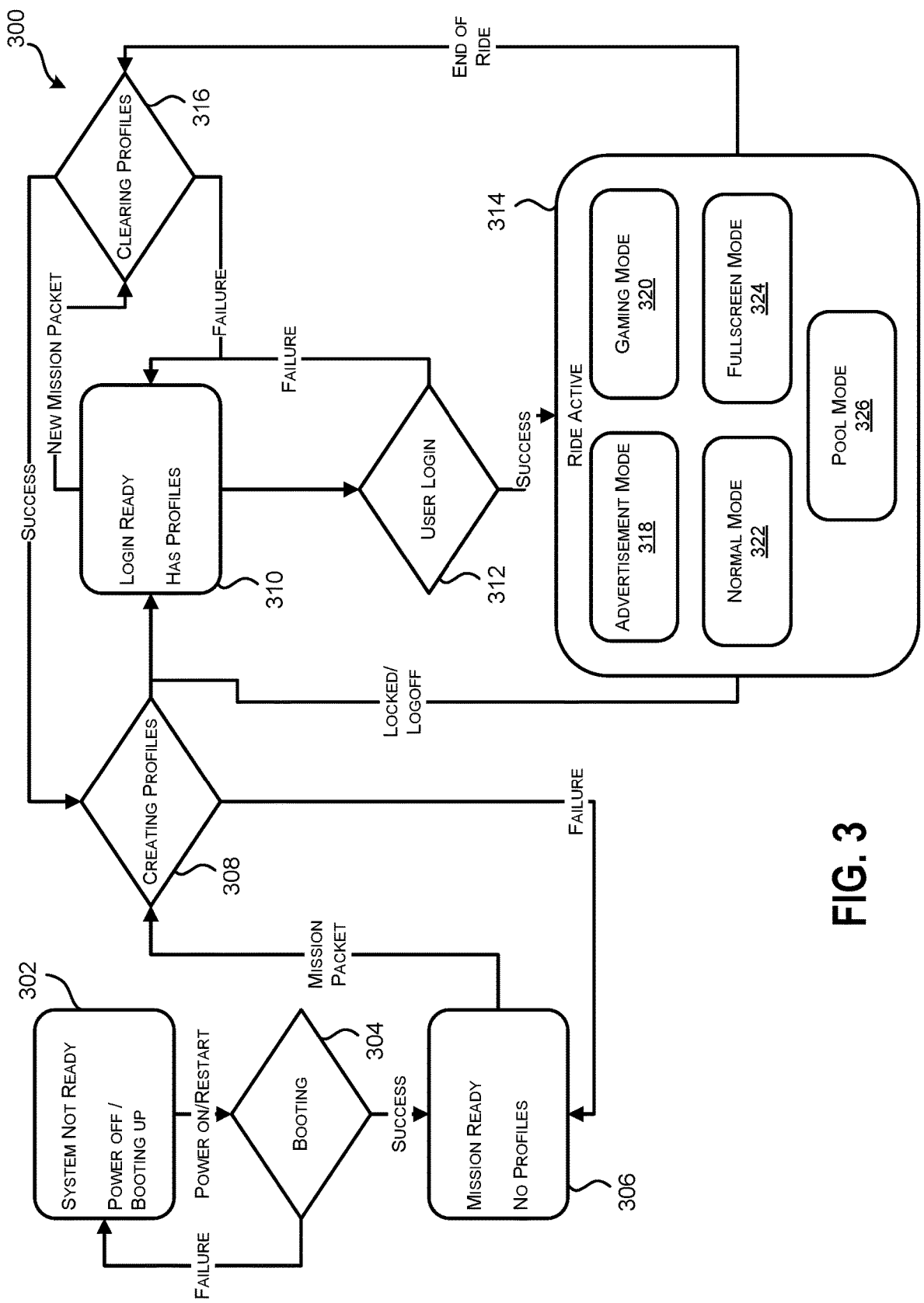
FIG. 3 illustrates a block diagram displaying states and sub-states of seat display modules, according to some embodiments.

FIG. 3 illustrates a block diagram 300 displaying states and sub-states of seat display modules, such as seat display modules 106A-D, according to some embodiments. In an initial SNR state at block 302, the seat display module 106 may be powered off and may boot up as the vehicle system 100 initializes, at block 304.

At block 306, the module is in a mission ready state. In the mission ready state, the module does not have any mission, user, or ride profiles, but is ready to receive different profiles and information.

At block 308, the profiles for the module are created through several additional steps. At block 310, the module is in a login ready state prepared for one or more passengers to login to the vehicle system and access user preferences, user destination, user route information, and other such information associated with a particular passenger.

Initially, the user may login at block 312, upon which login, the module may transition to a RA state at block 314. In the RA state, the seat display module 106A-D may be in an advertisement mode 318, gaming mode 320, normal mode 322, fullscreen mode 324, pool mode 326, or other such mode as described herein or otherwise envisioned in vehicle system 100.

At the end of the ride, or after a new passenger logs in to the seat display module, the profiles are cleared at block 316 and the block diagram 300 returns to block 308 for the creation of new profiles for additional passengers and/or destinations.

Figure 4:
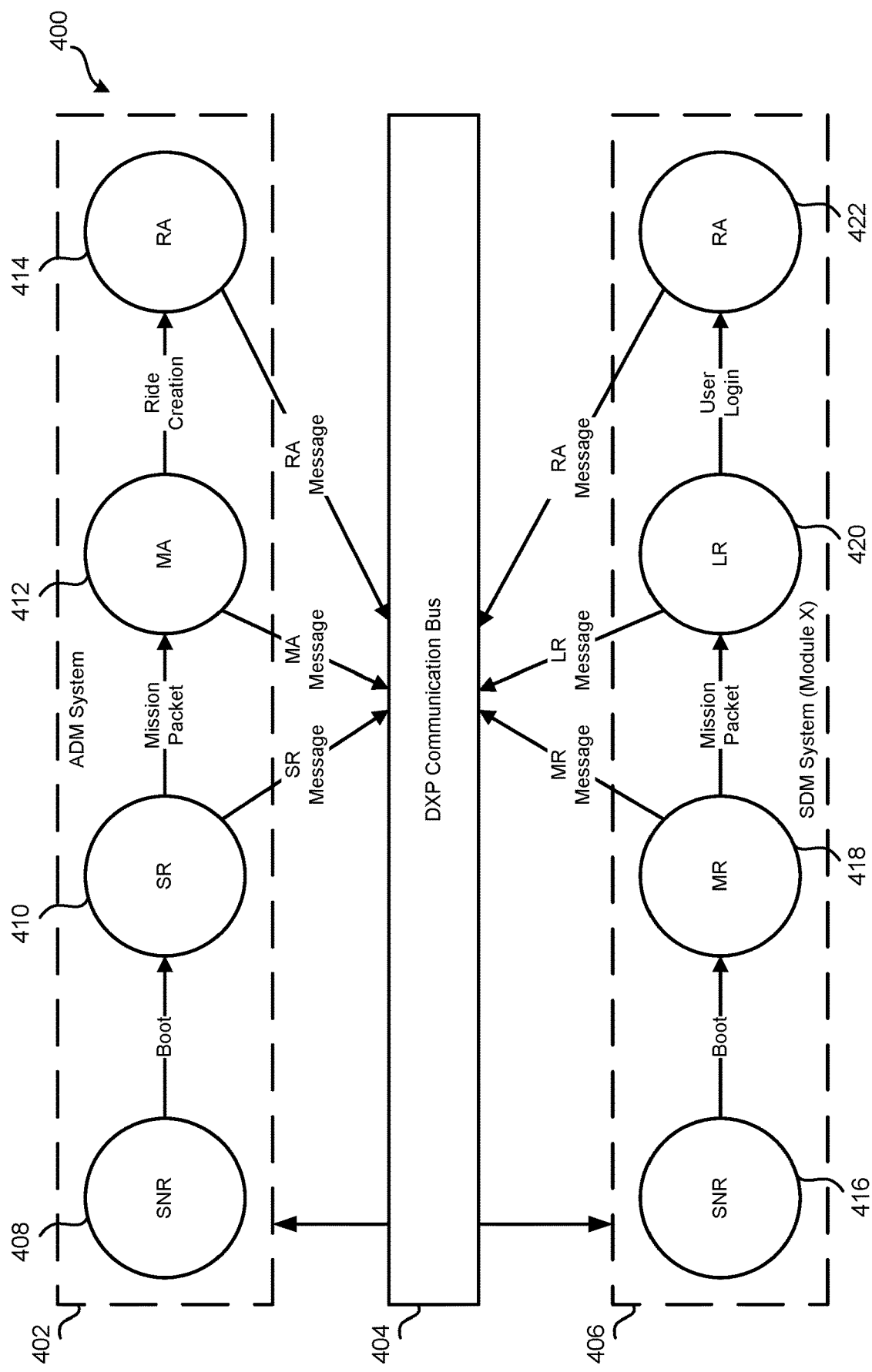
FIG. 4 illustrates a block diagram showing communication between seat display modules and auxiliary display modules over a communication bus, according to some embodiments.

FIG. 4 illustrates a block diagram 400 showing communication between seat display modules and auxiliary display modules over a communication bus, according to some embodiments. An auxiliary display module (ADM) system 402 and seat display module (SDM) system 406 communicate messages across the digital experience platform communication bus 404. Each of the ADM system 402 and the SDM system 406 are displayed with different system states and showing messages communicated across the digital experience platform communication bus 404.

The system states of the ADM system 402 include the system states shown and described with respect to FIG. 2 above. The system states include the SNR state 408, the SR state 410, the MA state 412, and the RA state 414. At the SNR state 408, there may not be any communications across the digital experience platform communication bus 404, due to the system not being initialized. At the SR state 410, a system ready message is communicated from the ADM system 402 to the digital experience platform communication bus 404 for distribution to the SDM system 406 and updating of system status information. At the MA state 412, a mission active message is communicated from the ADM system 402 to the digital experience platform communication bus 404 for distribution to the SDM system 406 and updating of system status information. At the RA state 414, a ride active message is communicated from the ADM system 402 to the digital experience platform communication bus 404 for distribution to the SDM system 406 and updating of system status information.

The system states of the SDM system 406 include the system states shown and described with respect to FIG. 3 above. The system states include the SNR state 416, the MR state 418, the Login Ready (LR) state 420, and the RA state 422. At the SNR state 416, there may not be any communications across the digital experience platform communication bus 404, due to the system not being initialized. At the MR state 418, a mission ready message is communicated from the SDM system 406 to the digital experience platform communication bus 404 for distribution to the ADM system 402 and other SDM systems 406 and updating of system status information. At the LR state 420, a login ready message is communicated from the SDM system 406 to the digital experience platform communication bus 404 for distribution to the ADM system 402 and other SDM systems 406 and updating of system status information. At the RA state 422, a ride active message is communicated from the SDM system 406 to the digital experience platform communication bus 404 for distribution to the ADM system 402 and the SDM system 406 and updating of system status information.

Figure 5:
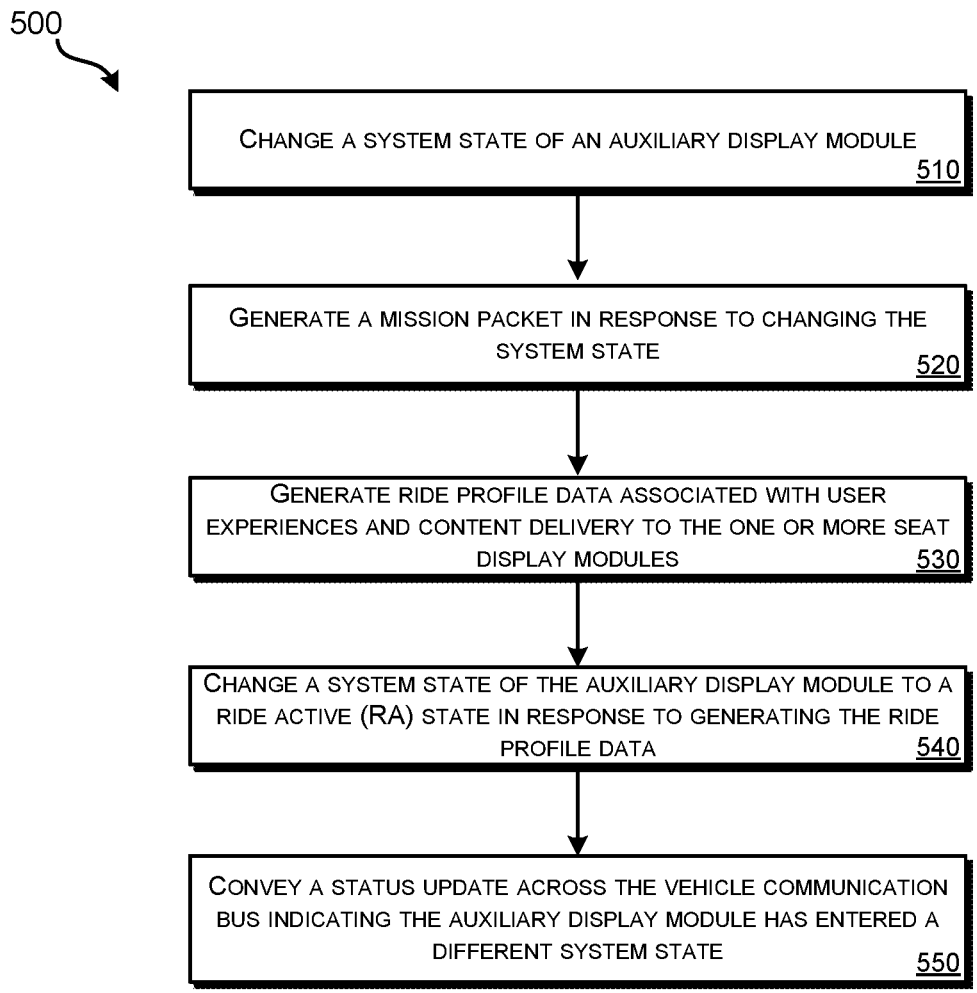
FIG. 5 illustrates a method for communicating a status update of an auxiliary display module across a digital experience platform communication bus, according to some embodiments.

FIG. 5 illustrates a method 500 for communicating a status update of an auxiliary display module across a digital experience platform communication bus, according to some embodiments. The method 500 may be performed by, for example, a computing system such as a computing system of the vehicle system 100 or may be performed by the computing system 702 of the vehicle system 700 of FIG. 7 or potentially by a cloud computing system 900 of FIG. 9. Though the steps of method 500 are presented in sequential order, some or all of the steps may be performed in different sequences, including simultaneously, in some examples.

At step 510, the auxiliary display module changes a system state of the auxiliary display module. The change in system state of the auxiliary display module may be a result of changing from a SNR to a SR state, as shown and described with respect to FIG. 2 above. The system state may be updated in response to a startup of the vehicle system, an input from a user, or in response to receiving information over the vehicle bus network.

At step 520, the auxiliary display module generates a mission packet in response to changing the system state. The mission packet may initially be unpopulated and can be populated with mission information relating to the passenger, mission start and end locations, time, route, and other such information.

At step 530, the auxiliary display module generates ride profile data for a passenger. For example, the ride profile data may be generated based on passenger input, such as content or media type selected by the passenger or selected based on preferences identified by the passenger. The auxiliary display module also delivers content to the one or more seat display modules. The auxiliary display module may not generate any data, but delivers content to the one or more seat displays that is received from other locations, such as the cloud network. The ride profile data may be provided based in part on one or more of the modes of the auxiliary display module. For example, advertisements, videos, and text content may be provided to the seat display modules from the auxiliary display module based on the ride profile data. The ride profile data may, for example include information selected based on user preferences, for example if a user has a preference to display video entertainment, video content may be included in the ride profile data.

At step 540, the auxiliary display module changes a system state of the auxiliary display module to a RA state in response to generating the ride profile data. This may be accomplished based on the flow of FIG. 2, moving from block 212 to block 214 where different RA modes are available for the auxiliary display module to provide and control each of the seat display modules.

At step 550, the auxiliary display module conveys a status update across the vehicle communication bus indicating the auxiliary display module has entered a different system state. The status update may be a ride active message, as shown in FIG. 4. The status update may cause each module and element connected to the communication bus to update a status indicator of the system status for the auxiliary display module to indicate the auxiliary module is in the ride active state and able to deliver content and control other modules based on the different ride active modes.

Figure 6:
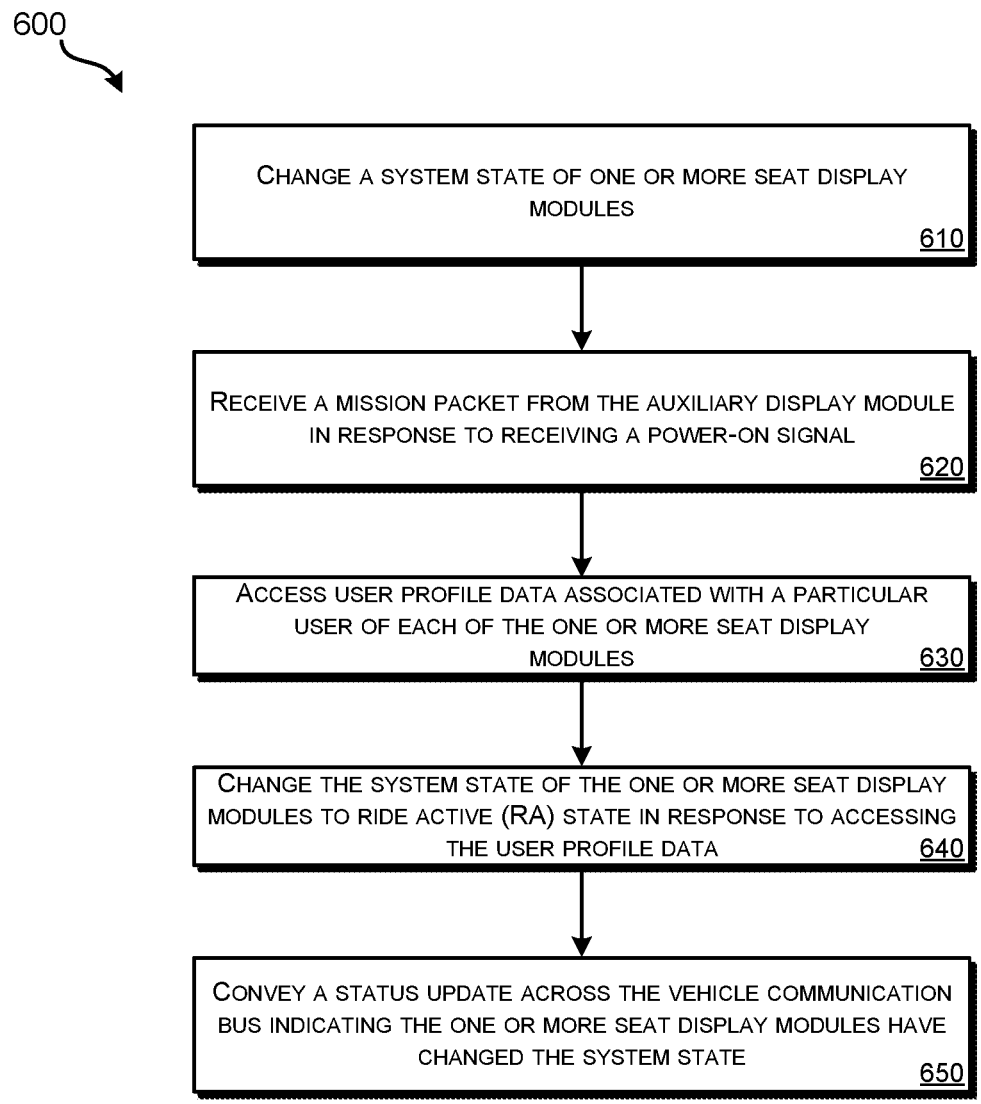
FIG. 6 illustrates a method for communicating a status update of a seat display module across a digital experience platform communication bus, according to some embodiments.

FIG. 6 illustrates a method 600 for communicating a status update of a seat display module across a digital experience platform communication bus, according to some embodiments. The method 600 may be performed by, for example, a computing system such as a computing system of the vehicle system 100 or may be performed by the computing system 702 of the vehicle system 700 of FIG. 7 or potentially by a cloud computing system 900 of FIG. 9. Though the steps of method 600 are presented in sequential order, some or all of the steps may be performed in different sequences, including simultaneously, in some examples.

At step 610, the seat display module changes a system state. The change in system state of the auxiliary display module may be a result of changing from a SNR to a SR state, as shown and described with respect to FIG. 3 above. The system state may be updated in response to a startup of the vehicle system, an input from a user, or in response to receiving information over the vehicle bus network.

At step 620, the seat display module receives a mission packet from the auxiliary display module in response to receiving a power-on signal. The mission packet may include mission information including destination information, route information, and the like. The mission packet may be the mission packet generated at step 530 of FIG. 5.

At step 630, the seat display module accesses user profile data associated with a particular user of each of the one or more seat display modules. The user profile data may be accessed by authenticating the identity of the passenger. For example, the user may authenticate using a mobile device associated with the passenger, may enter authentication credentials into the seat display module, or otherwise verify the identity of the passenger and access passenger account information associated with the passenger from a stored account.

At step 640, the seat display module changes the system state of the one or more seat display modules to RA state in response to accessing the user profile data. This may be accomplished based on the flow of FIG. 3, moving from block 312 to block 314 where different RA modes are available for the seat display module to provide for each of the individual passengers of the vehicle system.

At step 650, the seat display module conveys a status update across the vehicle communication bus indicating the one or more seat display modules have changed the system state. The status update may be a ride active message, as shown in FIG. 4 from RA state 422 of the SDM system 406. The status update may cause each module and element connected to the communication bus to update a status indicator of the system status for the seat display module to indicate the seat display module is in the ride active state and able to interact with the other modules based on the different ride active modes.

Figure 7:
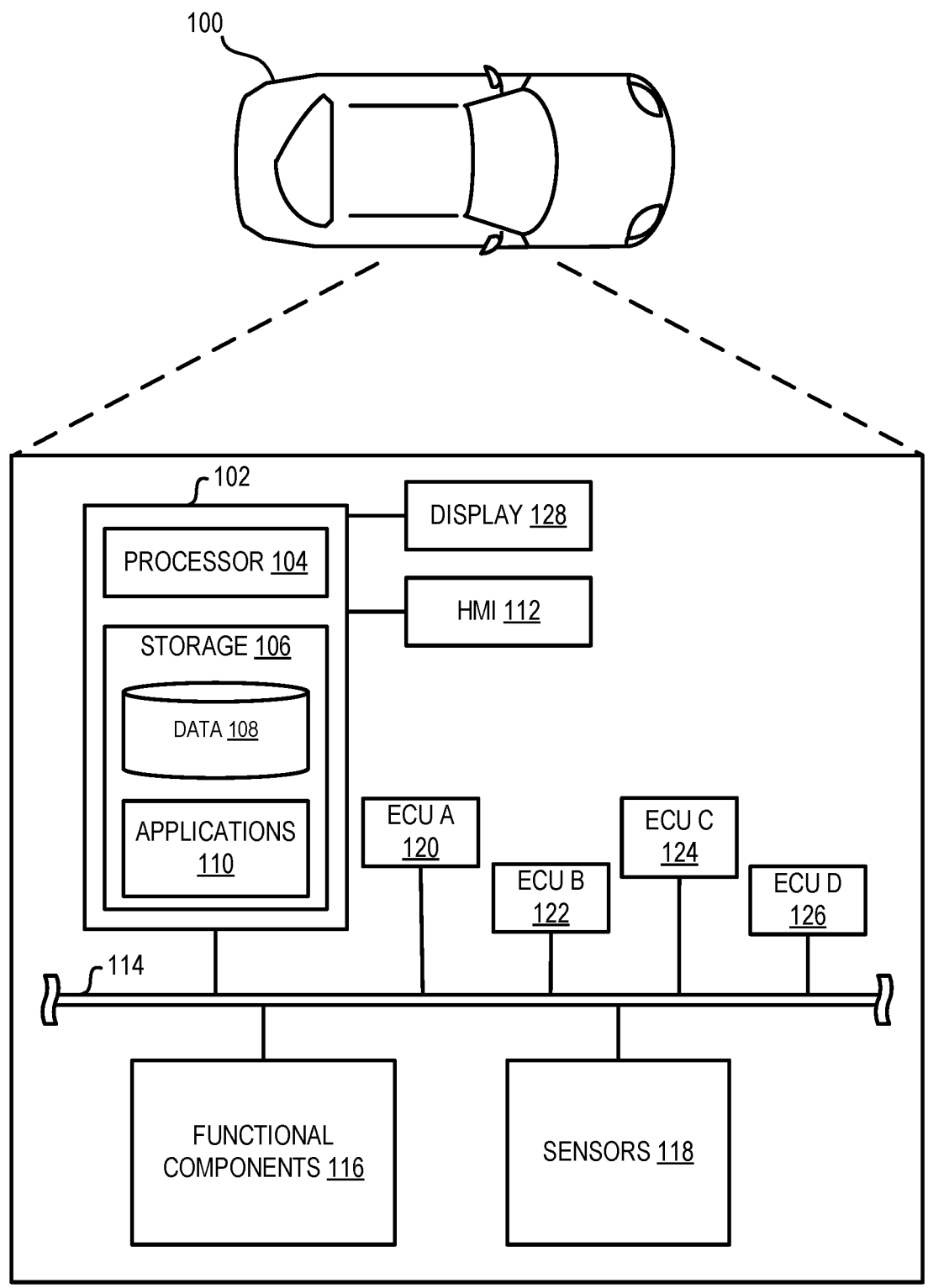
FIG. 7 illustrates a block diagram of a vehicle system, according to some embodiments.

Any suitable computing system or group of computing systems can be used for performing the operations or methods described herein. For example, FIG. 7 illustrates a vehicle system including a computing system 702 as well as multiple ECUs which may perform some or all of the functions described herein. FIG. 8 further depicts an example of a computing device 800 that may be at least a portion of computing system 702.

FIG. 7 illustrates a block diagram of a vehicle system 700, according to some embodiments. The vehicle system 700 may include a computing system 702 configured to communicate over an in-vehicle network 714. The computing system 702 includes a processor 704 and storage 706. While a vehicle system 700 is shown in FIG. 7, the example components as illustrated are not intended to be limiting. Indeed, the vehicle system 700 may have more or fewer components, and additional or alternative components and/or implementations may be used. It should be noted that the use of a vehicle system 700 environment is illustrative, as the components and/or functionality may be utilized in other types of systems such as flight control system in an airplane, or a medical device or industrial machine.

The vehicle system 700 may include various types of automobile, crossover utility vehicle (CUV), sport utility vehicle (SUV), truck, recreational vehicle (RV), boat, plane or other mobile machine for transporting people or goods. In many cases, the vehicle system 700 may be powered by an internal combustion engine. As another possibility, the vehicle system 700 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of the vehicle system 700 may vary, the capabilities of the vehicle system may correspondingly vary. As some other possibilities, vehicle system 700 may have different capabilities with respect to passenger capacity, towing ability and capacity, and storage volume.

The computing system 702 may include a Human Machine Interface (HMI) 712 and a display 728 for user interaction with the computing system 702. An example computing system 702 may be the SYNC™ system provided by FORD MOTOR COMPANY™ of Dearborn, Mich. In some examples the display 728 may include a vehicle infotainment system including one or more displays. The HMI 712 may be configured to support voice command and BLUETOOTH™ interfaces with the driver and driver carry-on devices, receive user input via various buttons or other controls, and provide vehicle status information to a driver or other vehicle system 700 occupants. For instance, the computing system 702 may interface with one or more buttons or other HMI 712 configured to invoke functions on the computing system 702 (e.g., steering wheel audio buttons, a push-to-talk button, instrument panel controls, etc.). The computing system 702 may also drive or otherwise communicate with the display 728 configured to provide visual output to vehicle occupants, e.g., by way of a video controller. In some cases, the display 728 may be a touch screen further configured to receive user touch input via the video controller, while in other cases the display 728 may be a display only, without touch input capabilities. In an example, the display 728 may be a head unit display included in a center console area of the vehicle system 700.

In another example, the display 728 may be a screen of a gauge cluster of the vehicle system 700.

The computing system 702 may further include various types of computing apparatus in support of performance of the functions of the computing system 702 described herein. In an example, the computing system 702 may include one or more processors 704 configured to execute computer instructions, and a storage 706 medium on which computer-executable instructions and/or data may be maintained. A computer-readable medium (also referred to as a processor-readable medium or storage 706) includes any non-transitory (e.g., tangible) medium that participates in providing data (e.g., instructions) that may be read by a computer (e.g., by the one or more processors 704). In general, the processor 704 receives instructions and/or data, e.g., from the storage 706, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc. The storage 706 may include divisions for data 708 and applications 710. The data 708 may store information such as databases and other such information. The applications 710 may store the computer-executable instructions or other such instructions executable by the processor 704.

The computing system 702 may be configured to communicate with mobile devices of the vehicle system 700 occupants. The mobile devices may be any of various types of portable computing device, such as cellular phones, tablet computers, smart watches, laptop computers, portable music players, or other devices capable of communication with the computing system 702. As with the computing system 702, the mobile device may include one or more processors configured to execute computer instructions, and a storage medium on which the computer-executable instructions and/or data may be maintained. In some examples, the computing system 702 may include a wireless transceiver (e.g., a BLUETOOTH™ controller, a ZIGBEE™ transceiver, a Wi-Fi transceiver, etc.) configured to communicate with a compatible wireless transceiver of the mobile device. Additionally, or alternately, the computing system 702 may communicate with the mobile device over a wired connection, such as via a USB connection between the mobile device and a Universal Serial Bus (USB) subsystem of the computing system 702.

The computing system 702 may be further configured to communicate with other components of the vehicle system 700 via one or more in-vehicle networks 714. The in-vehicle networks 714 may include one or more of a vehicle controller area network (CAN), an Ethernet network, or a media oriented system transfer (MOST), as some examples. The in-vehicle networks 714 may allow the computing system 702 to communicate with other units of the vehicle system 700, such as ECU A 720, ECU B 722, ECU C 724, and ECU D 726. The ECUs 720, 722, 724, and 726 may include various electrical or electromechanical systems of the vehicle system 700 or control various subsystems of the vehicle system 700. Some non-limiting examples of ECUs include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle system 700); a radio transceiver module configured to communicate with key fobs or other vehicle system 700 devices, a climate control management module configured to provide control and monitoring of heating and cooling system components (e.g., compressor clutch and blower fan control, temperature sensor information, etc.) as well as a transmission control module, a brake control module, a central timing module, a suspension control module, a vehicle modem (which may not be present in some configurations), a global positioning system (GPS) module configured to provide vehicle system 700 location and heading information, and various other vehicle ECUs configured to corporate with the computing system 702. The subsystems controlled by the various ECUs may include functional components 716 of the vehicle system 700 including elements such as the powertrain, engine, brakes, lights, steering components, and the like. Additionally, some or all of the functional components 716 may include sensors 718 as well as additional sensors equipped to the vehicle system 700 for detecting various states, positions, proximity, temperature, and the like of the vehicle system 700 and subsystems thereof. The ECUs 720, 722, 724, 726 may communicate with the computing system 702 as well as the functional components 716 and the sensors 718 over the in-vehicle network 714. While only four ECUs are depicted in FIG. 7, any number (more or fewer) of ECUs may be included in vehicle system 700.

FIG. 8 illustrates a block diagram of an example of a computing device 800. Computing device 800 can be any of the described computers herein including, for example, computing system 702 within the vehicle system 700 of FIG. 7 as well as ECUs 720, 722, 724, 726. The computing device 800 can be or include, for example, an integrated computer, a laptop computer, desktop computer, tablet, server, or other electronic device.

The computing device 800 can include a processor 840 interfaced with other hardware via a bus 805. A memory 810, which can include any suitable tangible (and non-transitory) computer readable medium, such as RAM, ROM, EEPROM, or the like, can embody program components (e.g., program code 815) that configure operation of the computing device 800. Memory 810 can store the program code 815, program data 817, or both. In some examples, the computing device 800 can include input/output ("I/O") interface components 825 (e.g., for interfacing with a display 845, keyboard, mouse, and the like) and additional storage 830.

The computing device 800 executes program code 815 that configures the processor 840 to perform one or more of the operations described herein. Examples of the program code 815 include, in various embodiments logic flowchart described with respect to FIGS. 2-6 above. The program code 815 may be resident in the memory 810 or any suitable computer-readable medium and may be executed by the processor 840 or any other suitable processor.

The computing device 800 may generate or receive program data 817 by virtue of executing the program code 815. For example, sensor data, trip counter, authenticated messages, trip flags, and other data described herein are all examples of program data 817 that may be used by the computing device 800 during execution of the program code 815.

The computing device 800 can include network components 820. Network components 820 can represent one or more of any components that facilitate a network connection. In some examples, the network components 820 can facilitate a wireless connection and include wireless interfaces such as IEEE 802.11, BLUETOOTH™, or radio interfaces for accessing cellular telephone networks (e.g., a transceiver/antenna for accessing CDMA, GSM, UMTS, or other mobile communications network). In other examples, the network components 820 can be wired and can include interfaces such as Ethernet, USB, or IEEE 1394.

Although FIG. 8 depicts a computing device 800 with a processor 840, the system can include any number of computing devices 800 and any number of processor 840. For example, multiple computing devices 800 or multiple processor 840 can be distributed over a wired or wireless network (e.g., a Wide Area Network, Local Area Network, or the Internet). The multiple computing devices 800 or multiple processor 840 can perform any of the steps of the present disclosure individually or in coordination with one another.

Figure 9:
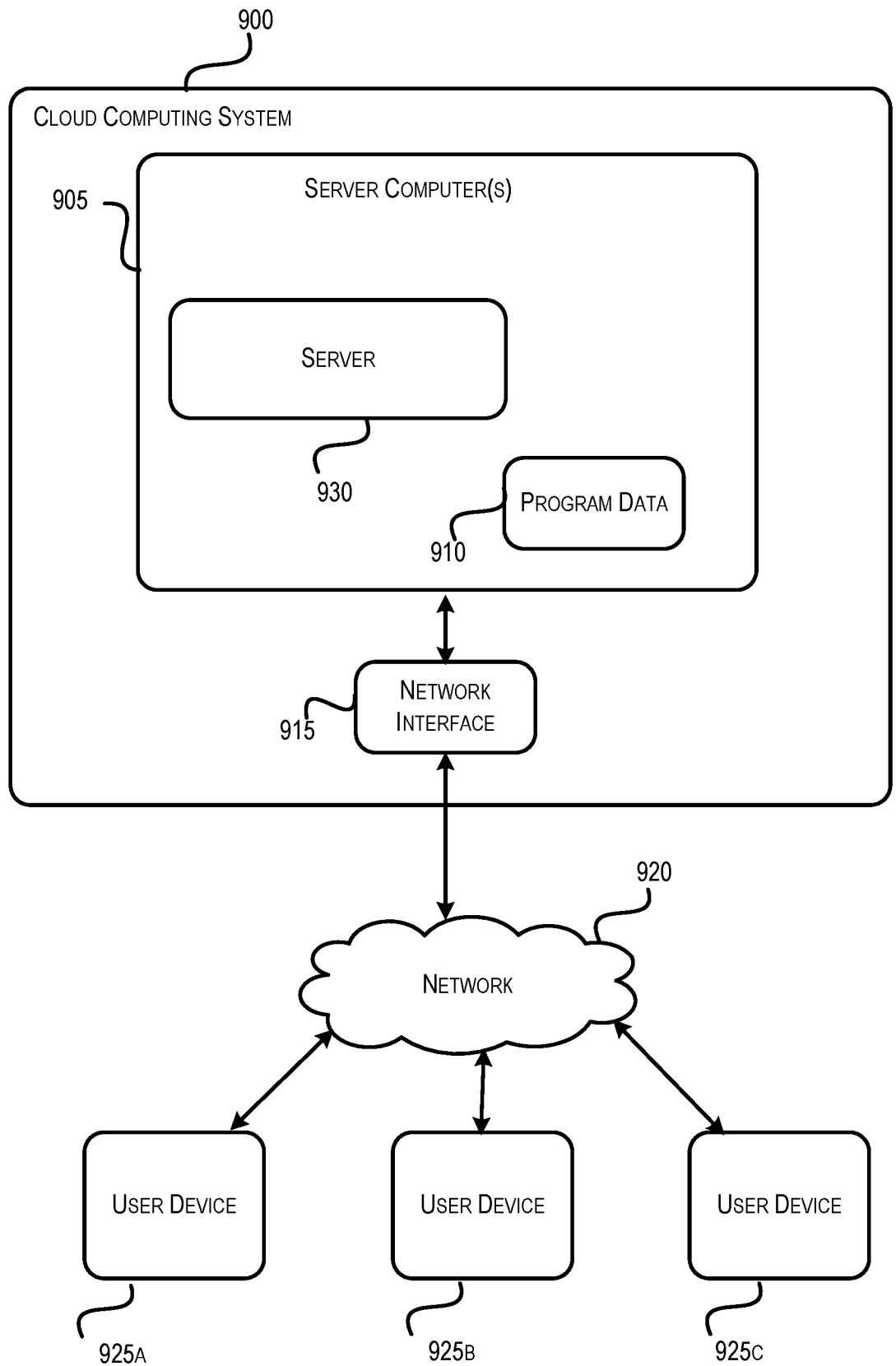
FIG. 9 illustrates a cloud computing system, according to some embodiments.

In some embodiments, the functionality provided by the computing device 900 may be offered as cloud services by a cloud service provider. For example, FIG. 9 depicts an example of a cloud computing system 900 offering an intelligence service that can be used by a number of user subscribers using user devices 925a, 925b, and 925c across a data network 920. User devices 925a, 925b, and 925c could be examples of a vehicle system 700 described above. In the example, the intelligence service may be offered under a Software as a Service (SaaS) model. One or more users may subscribe to the intelligence service, and the cloud computing system performs the processing to provide the intelligence service to subscribers. The cloud computing system may include one or more remote server computers 905.

The remote server computers 905 include any suitable non-transitory computer-readable medium for storing program code (e.g., server 930) and program data 910, or both, which is used by the cloud computing system 900 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 905 can include volatile memory, non-volatile memory, or a combination thereof.

One or more of the server computers 905 execute the program data 910 that configures one or more processors of the server computers 905 to perform one or more of the operations that determine locations for interactive elements and operate the adaptive rule-based system. As depicted in the embodiment in FIG. 9, the one or more server computers 905 provide the services to perform the adaptive rule-based system via the server 930. Any other suitable systems or subsystems that perform one or more operations described herein (e.g., one or more development systems for configuring an interactive user interface) can also be implemented by the cloud computing system 900.

In certain embodiments, the cloud computing system 900 may implement the services by executing program code and/or using program data 910, which may be resident in a memory device of the server computers 905 or any suitable computer-readable medium and may be executed by the processors of the server computers 905 or any other suitable processor.

In some embodiments, the program data 910 includes one or more datasets and models described herein. Examples of these datasets include dealership data, classification data, etc. In some embodiments, one or more of data sets, models, and functions are stored in the same memory device. In additional or alternative embodiments, one or more of the programs, data sets, models, and functions described herein are stored in different memory devices accessible via the data network 920.

The cloud computing system 900 also includes a network interface device 915 that enable communications to and from cloud computing system 900. In certain embodiments, the network interface device 915 includes any device or group of devices suitable for establishing a wired or wireless data connection to the data networks 920. Non-limiting examples of the network interface device 915 include an Ethernet network adapter, a modem, and/or the like. The server 930 is able to communicate with the user devices 925a, 925b, and 925c via the data network 920 using the network interface device 915.

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A vehicle system, comprising:
one or more seat display modules;
a vehicle communication bus; and
an auxiliary display module including a processor and a storage, connected to the one or more seat display modules via the vehicle communication bus, the auxiliary display module programmed to:
change a system state of the auxiliary display module from a system not ready (SNR) state to a system ready (SR) state in response to receiving an activation signal;
generate a mission packet in response to changing to the SR state, the mission packet including contents for display at the one or more seat display modules;
generate ride profile data for a passenger and content for delivery to the one or more seat display modules;
change a system state of the auxiliary display module to a ride active (RA) state in response to generating the ride profile data; and
convey, in response to changing the system state of the auxiliary display module, a status update across the vehicle communication bus to the one or more seat display modules, the status update indicating the auxiliary display module has entered a different system state and the status update instructing a change in a system state of the one or more seat display modules based on the system state of the auxiliary display module.

2. The vehicle system of claim 1, wherein the auxiliary display module is further programmed to provide content to the one or more seat display modules based on the system state of the one or more seat display modules.

3. The vehicle system of claim 1 wherein the auxiliary display module is further programmed to provide content to the one or more seat display modules based on the system state of the auxiliary display module.

4. The vehicle system of claim 1, wherein the auxiliary display module is further programmed to designate one seat display module of the one or more seat display modules as a primary module, the primary module enabled to control one or more vehicle-wide systems.

5. The vehicle system of claim 4, wherein the one or more vehicle-wide systems comprise an audio system or an environmental conditioning system of the vehicle system.

6. The vehicle system of claim 1, wherein the auxiliary display module is configurable between an advertisement mode, a gaming mode, a normal mode, and a pool mode while the auxiliary display module is in the RA state.

7. The vehicle system of claim 1, wherein the auxiliary display module is further programmed to communicate with one or more additional vehicle systems via a gateway of the vehicle system.

8. A vehicle system, comprising:
an auxiliary display module;
a vehicle communication bus; and
one or more seat display modules each including a processor and a storage, connected to the auxiliary display module via the vehicle communication bus, the one or more seat display modules programmed to:
change a system state of the one or more seat display modules from a system not ready (SNR) state to a mission ready (SR) state in response to receiving an activation signal;
receive a mission packet from the auxiliary display module in response to receiving a power-on signal, the mission packet including contents for display by the one or more seat display modules;
access user profile data associated with a particular user of each of the one or more seat display modules;
change the system state of the one or more seat display modules to ride active (RA) state in response to accessing the user profile data; and
convey, in response to changing the system state of the one or more seat display modules, a status update across the vehicle communication bus to the auxiliary display module, the status update indicating the one or more seat display modules have changed the system state and the status update instructing a change in a system state of another of the one or more seat display modules based on the system state of the one or more seat display modules.

9. The vehicle system of claim 8, wherein receiving the activation signal comprises authenticating a user associated with one of the one or more seat display modules.

10. The vehicle system of claim 8, wherein each of the one or more seat display modules are further programmed to provide content on a display based on the user profile data.

11. The vehicle system of claim 8, wherein each of the one or more seat display modules are further programmed to receive content from the auxiliary display module and present the content from the auxiliary display module on a display.

12. The vehicle system of claim 8, wherein each of the one or more seat display modules are communicatively coupled with a remainder of the one or more seat display modules such that content is shareable between the one or more seat display modules when the one or more seat display modules are in a same state.

13. The vehicle system of claim 8, wherein each of the one or more seat display modules are communicatively coupled with a computing system external to the vehicle system such that content is shareable between the computing system and the one or more seat display modules while in the RA state.

14. The vehicle system of claim 8, wherein the one or more seat display modules are each configurable between an advertisement mode, a gaming mode, a normal mode, a fullscreen mode, and a pool mode while the one or more seat display modules are in the RA state.

15. A vehicle system, comprising:
an auxiliary display module;
a vehicle communication bus; and
one or more seat display modules communicatively coupled to the auxiliary display module via the vehicle communication bus, the one or more seat display modules comprising:

a user interface;

a processor; and a memory having instructions stored thereon that, when executed by the processor, cause the processor to:

change a system state of the seat display module based on an activation signal;

access user data associated with a user of the one or more seat display modules;

convey system state update information via the vehicle communication bus to the auxiliary display module;

receive, from the auxiliary display module, system state information of the auxiliary display module via the vehicle communication bus; and change a system state of the seat display module based on the system state information of the auxiliary display module.

16. The vehicle system of claim 15, wherein the instructions further cause the processor to authenticate a user identity.

17. The vehicle system of claim 16, wherein the instructions further cause the processor to convey a signal to activate operation of one or more subsystems of the vehicle system.

18. The vehicle system of claim 16, wherein the vehicle system is disabled until the user identity is authenticated via the seat display module.

19. The vehicle system of claim 15, wherein the seat display module is configurable between a system not ready state, a mission ready state, a login ready state, and a ride active state.

20. The vehicle system of claim 19, wherein the seat display module is configurable between a pool mode, an advertisement mode, a normal mode, a fullscreen mode, and a gaming mode while in the ride active state.

* * * * *